(12) United States Patent
Flores et al.

(10) Patent No.: US 7,075,555 B1
(45) Date of Patent: *Jul. 11, 2006

(54) METHOD AND APPARATUS FOR USING A COLOR TABLE SCHEME FOR DISPLAYING INFORMATION ON EITHER COLOR OR MONOCHROME DISPLAY

(75) Inventors: Roger Flores, Redwood City, CA (US); Steve Lemke, Sunnyvale, CA (US); Bob Ebert, Montpellier (FR); Jeff Parrish, Lattes (FR)

(73) Assignee: PalmSource, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/579,792

(22) Filed: May 26, 2000

(51) Int. Cl.
*G09G 5/02* (2006.01)
*G06F 3/00* (2006.01)

(52) U.S. Cl. ...................... 345/601; 715/771
(58) Field of Classification Search ............... 345/581, 345/589, 593, 601–605
See application file for complete search history.

(56) References Cited

U.S. PATENT DOCUMENTS

| | | | | |
|---|---|---|---|---|
| 4,521,770 A | * | 6/1985 | Rhyne ...................... 345/589 |
| 4,837,710 A | * | 6/1989 | Zelinsky et al. ............ 345/594 |
| 4,864,503 A | | 9/1989 | Tolin ........................ 364/419 |
| 5,068,644 A | * | 11/1991 | Batson et al. ............... 345/601 |
| 5,138,305 A | * | 8/1992 | Tomiyasu ................... 345/3.1 |
| 5,220,503 A | | 6/1993 | Suzuki et al. .............. 364/419 |
| 5,418,717 A | | 5/1995 | Su et al. ................. 364/419.08 |
| 5,483,631 A | * | 1/1996 | Nagai et al. ................ 345/736 |
| 5,515,077 A | * | 5/1996 | Tateyama ................... 345/593 |
| 5,552,803 A | * | 9/1996 | Rhodes et al. .............. 345/119 |
| 5,586,236 A | * | 12/1996 | Quarato ..................... 345/593 |
| 5,638,522 A | | 6/1997 | Dunsmuir et al. ........... 395/326 |
| 5,670,986 A | * | 9/1997 | Leak ......................... 345/604 |
| 5,671,378 A | | 9/1997 | Acker et al. ................ 395/334 |
| 5,699,079 A | * | 12/1997 | Gossett ...................... 345/605 |
| 5,903,265 A | | 5/1999 | Bogdan ...................... 345/334 |
| 5,943,236 A | | 8/1999 | Ohno et al. ............. 364/468.15 |
| 5,991,711 A | | 11/1999 | Seno et al. .................... 704/3 |
| 6,011,540 A | * | 1/2000 | Berlin et al. ................ 345/601 |
| 6,014,133 A | * | 1/2000 | Yamakado et al. .......... 345/501 |
| 6,034,676 A | | 3/2000 | Egan et al. ................. 345/326 |
| 6,049,316 A | * | 4/2000 | Nolan et al. ................ 345/698 |
| 6,111,572 A | | 8/2000 | Blair et al. ................ 345/333 |
| 6,115,544 A | | 9/2000 | Mueller ................... 395/185.1 |

(Continued)

*Primary Examiner*—Ryan Yang
(74) *Attorney, Agent, or Firm*—Berry & Associates P.C.

(57) ABSTRACT

A method and system of determining the screen capability and rendering the appropriate display attribute is herein described. The present invention performs this task by using a color table, which contains a list of object types and a corresponding list of display attributes. The application program obtains the correct display attribute for the object by calling the color table, giving it an identifier of the object. The color table is indexed by the identifier of the object and a screen capability flag that is obtained, in one embodiment, from the operating system. The color table provides the display attribute for the specified object based on the screen capability flag. Advantageously, the application program does not need to know the computer's display capability. Furthermore, the application program needs only one piece of computer code, regardless of the number of display capabilities which are possible. Thus, memory space in the palmtop is conserved. In another embodiment of the present invention, the application program is allowed to modify the default values of the display attributes in the color table. Thus, an application program could use its own color to display an object if the default color is undesirable.

21 Claims, 13 Drawing Sheets

U.S. PATENT DOCUMENTS

| | | |
|---|---|---|
| 6,172,669 B1 * | 1/2001 | Murphy et al. ............. 345/601 |
| 6,266,805 B1 | 7/2001 | Nwana et al. ................. 717/4 |
| 6,268,852 B1 | 7/2001 | Lindhorst et al. ........... 345/335 |
| 6,295,056 B1 | 9/2001 | Morgan et al. ............. 345/334 |
| 6,313,822 B1 * | 11/2001 | McKay et al. .............. 345/545 |
| 6,314,555 B1 | 11/2001 | Ndumu et al. ................. 717/1 |
| 6,321,188 B1 | 11/2001 | Hayashi et al. ................ 704/4 |
| 6,329,991 B1 | 12/2001 | Fukuda et al. .............. 345/435 |
| 6,345,298 B1 * | 2/2002 | Moriya ...................... 709/228 |
| 6,369,840 B1 | 4/2002 | Barnett et al. .............. 345/853 |
| 6,374,293 B1 | 4/2002 | Dev et al. ................... 709/220 |
| 6,385,459 B1 | 5/2002 | Lawrence et al. ........... 455/508 |
| 6,407,755 B1 | 6/2002 | Prabhu et al. .............. 345/765 |
| 6,421,571 B1 | 7/2002 | Spriggs et al. ................ 700/17 |
| 6,433,798 B1 * | 8/2002 | Smith et al. ................ 715/764 |
| 6,438,515 B1 | 8/2002 | Crawford et al. .............. 704/5 |
| 6,445,774 B1 | 9/2002 | Kidder et al. .............. 379/9.03 |
| 6,448,958 B1 * | 9/2002 | Muta ........................... 345/169 |
| 6,476,821 B1 * | 11/2002 | Sawada et al. ............. 345/620 |
| 6,493,464 B1 | 12/2002 | Hawkins et al. ............ 382/189 |
| 6,615,293 B1 * | 9/2003 | Shima et al. ................ 710/30 |
| 2002/0000995 A1 * | 1/2002 | Sawada et al. ............. 345/620 |

* cited by examiner

100a

100b

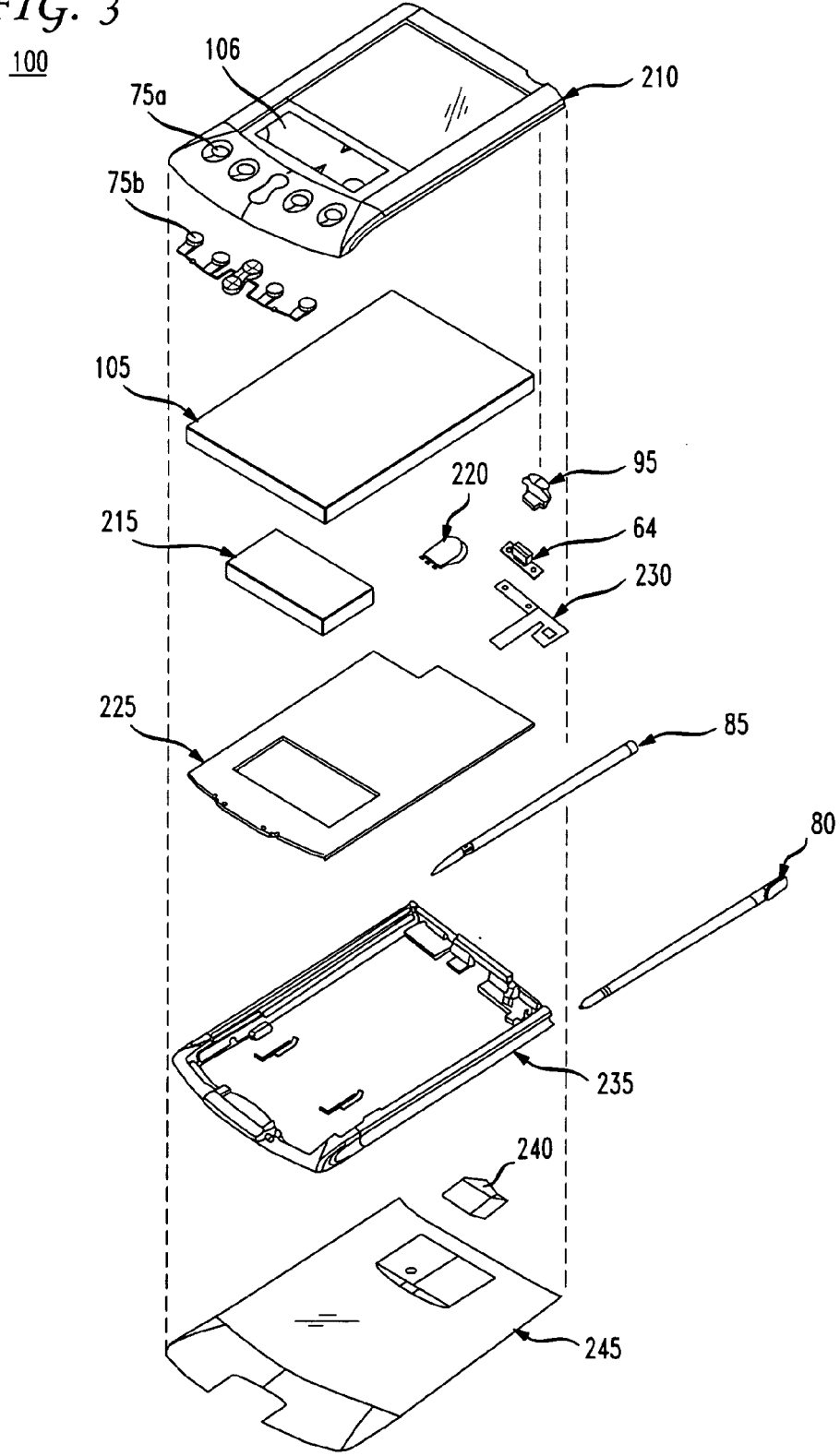

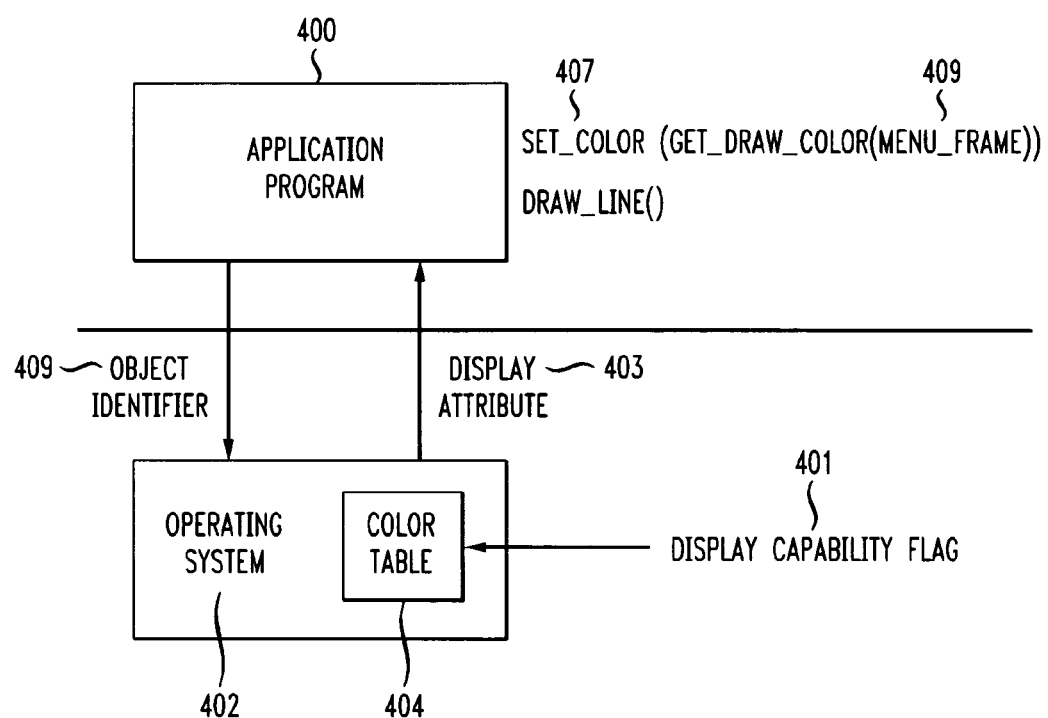

FIG. 8A

| | 404 COLOR TABLE | 450 DISPLAY ATTRIBUTE LISTS | | |
|---|---|---|---|---|
| | | 420 | 422 | 424 | 426 |

| OBJECT IDENTIFIER LIST | 1 BIT OR MONOCHROME DISPLAY ATTRIBUTE LIST | 2 BIT GRAY-SCALE DISPLAY ATTRIBUTE LIST | 4 BIT GRAY-SCALE DISPLAY ATTRIBUTE LIST | 8 BIT COLOR DISPLAY ATTRIBUTE LIST |
|---|---|---|---|---|
| BUTTON BORDER | BLACK | GRAY LEVEL 4 | GRAY LEVEL 16 | GREEN |
| MENU FRAME | BLACK | GRAY LEVEL 1 | GRAY LEVEL 1 | RED |
| MENU FILL | WHITE | GRAY LEVEL 2 | GRAY LEVEL 5 | YELLOW |
| MENU FOREGROUND | BLACK | GRAY LEVEL 3 | GRAY LEVEL 11 | BLUE |

UIObjectFrame,
UIObjectFill,
UIObjectForeground,
UIObjectSelectedFill,
UIObjectSelectedForeground, 409 → UIMenuFrame,
      → UIMenuFill,
UIMenuForeground,
UIMenuSelectedFill,
UIMenuSelectedForeground, UIFieldBackground,
UIFieldText,
UIFieldTextLines,
UIFieldCaret,
UIFieldTextHighlightBackground,
UIFieldTextHighlightForeground,
UIFieldFepRawText,
UIFieldFepRawBackground,
UIFieldFepConvertedText,
UIFieldFepConvertedBackground,
UIFieldFepUnderLine, UIFormFrame,
UIFormFill, UIDialogFrame,
UIDialogFill, UIAlertFrame,
UIAlertFill, UIOK,
UICaution,
UIWarning,

FIG. 9

404 COLOR TABLE

450 DISPLAY ATTRIBUTE LISTS

| OBJECT IDENTIFIER LIST | 1 BIT OR MONOCHROME DISPLAY ATTRIBUTE LIST (420) | 2 BIT GRAY-SCALE DISPLAY ATTRIBUTE LIST (422) | 4 BIT GRAY-SCALE DISPLAY ATTRIBUTE LIST (424) | 8 BIT COLOR DISPLAY ATTRIBUTE LIST (426) | DEBUG DISPLAY ATTRIBUTE LIST (428) |
|---|---|---|---|---|---|
| BUTTON BORDER (408) | BLACK | GRAY LEVEL 4 | GRAY LEVEL 16 | GREEN | RED |
| MENU FRAME (410) | BLACK | GRAY LEVEL 1 | GRAY LEVEL 1 | RED | GREEN |
| MENU FILL (412) | WHITE | GRAY LEVEL 2 | GRAY LEVEL 5 | YELLOW | PURPLE |
| MENU FOREGROUND (414) | BLACK | GRAY LEVEL 3 | GRAY LEVEL 11 | DEEP RED | YELLOW |

406

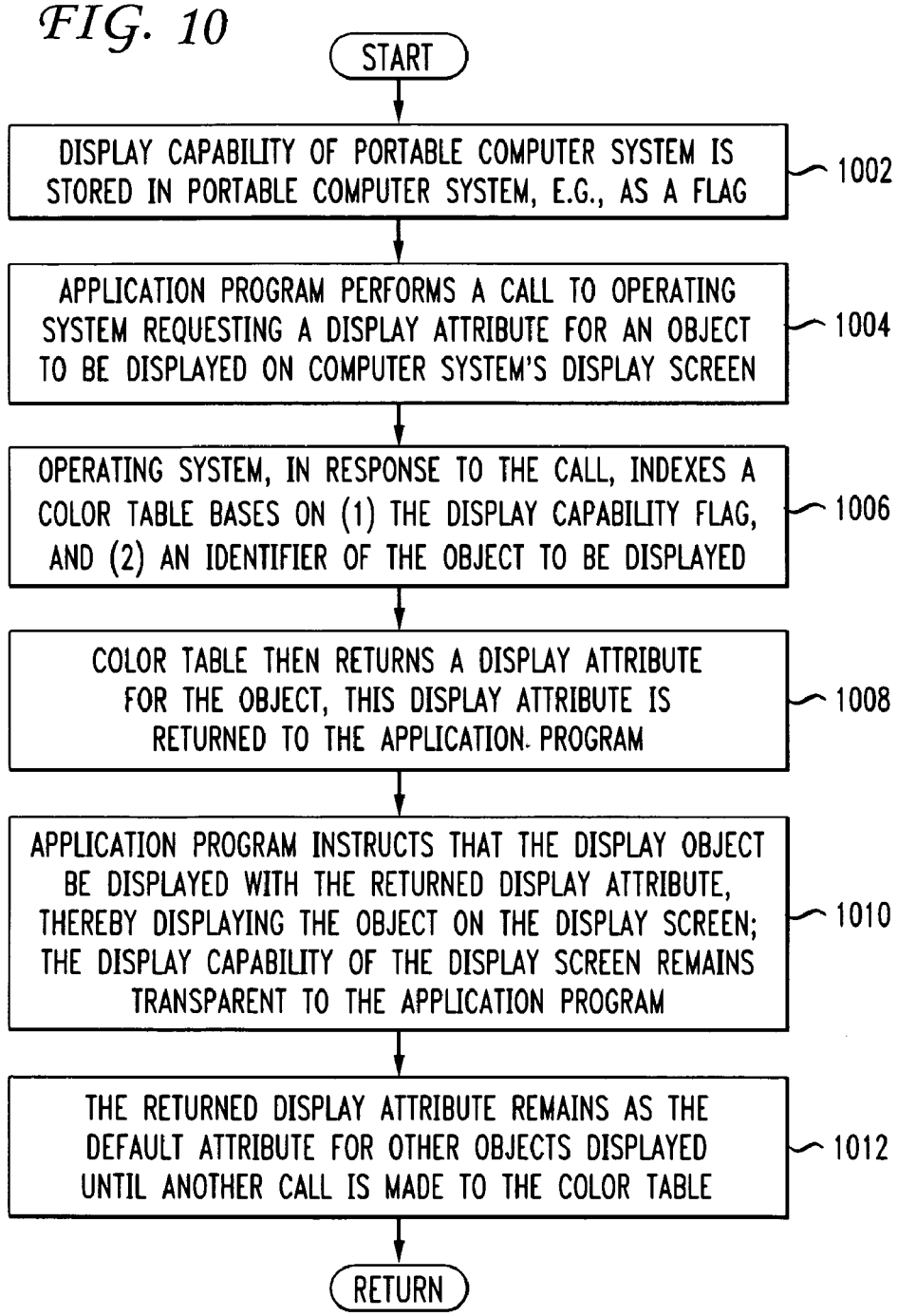

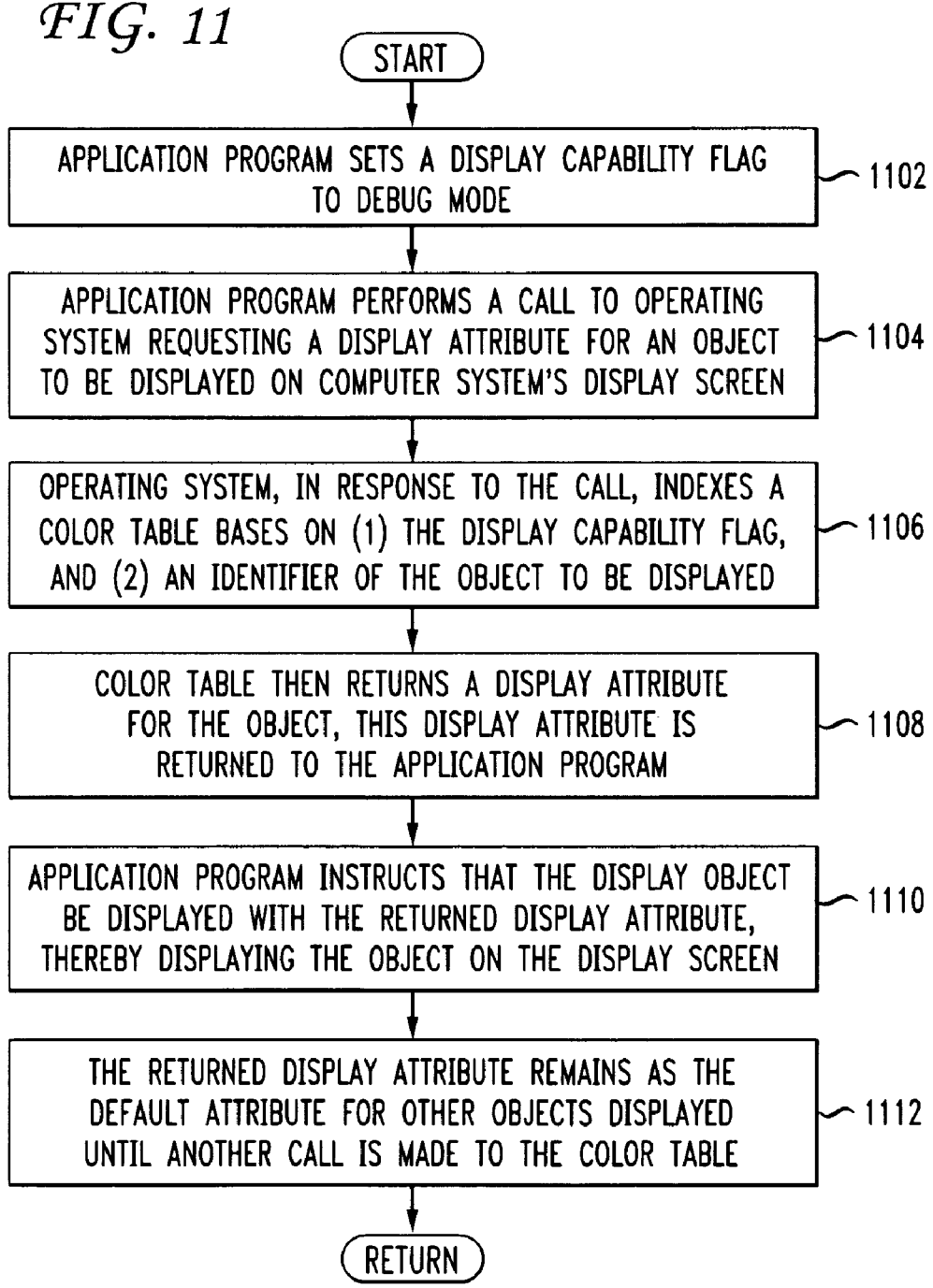

METHOD AND APPARATUS FOR USING A COLOR TABLE SCHEME FOR DISPLAYING INFORMATION ON EITHER COLOR OR MONOCHROME DISPLAY

BACKGROUND OF THE INVENTION

1. Field of the Invention

The present invention relates to the field of graphical user interfaces (GUIs) within computer systems. The present invention can relate to the field of palmtop computers. Specifically, the present invention discloses an efficient method and apparatus of operating computer systems with multiple screen display capabilities.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most palmtop computer systems are used to implement various Personal Information Management (PIM) applications such as an address book, a daily organizer and electronic notepads, to name a few.

Since palmtop computer systems are very small, full-sized keyboards are generally not efficient input devices. Palmtop computers using keyboards have keyboard devices that are so small that a user cannot touch-mode. Furthermore, to use a keyboard device, a user must either place the palmtop computer system down onto a flat surface, so the user can mode with both hands, or the user holds the palmtop computer system with two hands and modes with thumbs only.

Instead of a keyboard device, some palmtop computers utilize a touch screen and display an image of a small keyboard thereon. When a particular button is pressed or tapped, a small keyboard image is displayed on the display screen. The user then interacts with the on-screen small keyboard image to enter characters, usually one character at a time. To interact with the displayed keyboard image (e.g., "virtual keyboard"), the user taps the screen location of a character with a pen. That corresponding character is then recognized and added to a data entry field, also displayed on the screen. However, for experienced users, the virtual keyboard input system can be a tedious input process.

Instead of using a keyboard device or a displayed keyboard, many palmtop computers employ a pen and a digitizer pad as an input system. The pen and digitizer pad combination works well for palmtop computers because the arrangement allows a user to hold the palmtop computer system in one hand while writing with the pen onto the digitizer pad with the other hand.

As technology is progressing, palmtop computers are developing greater display capability, such as: monochrome; gray-scale; and color display is suggested. Within each display capability a variety of display attributes are possible. That is, each shade of gray or each unique color constitutes a distinct display attribute. Application programs utilize these display capabilities in a variety of ways, such as: rendering objects with a display attribute that will cue the user that those objects are selectable; choosing an aesthetically pleasing display; and, organizing the screen information in a more meaningful way. However, the possible display attributes for an object depends upon the display capability of each device. That is, an object can be rendered either a shade of gray or a specific color, depending on the display capability of the device. Thus, the color of the object cannot be known until the screen capability is known. Heretofore, different variations of each application program have been written to accommodate the different display types because there are a number of different display types in the consumer palmtop market. This is inefficient, and will grow more inefficient as palmtop computer displays gain more modes of display.

A further problem is the application programmer's task of debugging display programs. As stated, these programs may render various objects in different colors from each other. However, for aesthetic reasons, the colors may be similar to each other. Therefore, when the program is tested, the programmer may not detect when an object is being displayed in the wrong color or gray-scale. The inherently small size of the display makes this especially problematic.

Not only do application programs face problems caused by multiple screen display capabilities, but Internet applications do as well, as it is possible to interface a palmtop computer to the Internet. Thus, Internet applications, such as e-mail, web-browsing, and downloading information all face problems displaying information. Additionally, the operating system of the palmtop must be able to handle the possibility of different display capabilities without resorting to adding substantially more code. Thus, it would be advantageous to provide a more efficient way to produce screen display code.

SUMMARY OF THE INVENTION

Accordingly, what is needed is an effective mechanism and method for determining the screen display capability and to render objects with the appropriate display attribute accordingly. What is further needed is an information display system for allowing an application program to set the display attributes to be rendered according to its own needs, as well as the display capabilities of the computer system. What is still further needed is an information display system for easily debugging the appearance of application programs. What is additionally needed is an information display system that is very memory efficient. The present invention provides these advantages and others not specifically mentioned above but described in the sections to follow.

A method and system of determining the screen capability and rendering the appropriate display attribute is herein described. The present invention performs this task by using a color table, which contains a list of object types and a corresponding list of display attributes. The application program obtains the correct display attribute for the object by calling the color table, giving it an identifier of the object. The color table is indexed by the identifier of the object and a screen capability flag that is obtained, in one embodiment, from the operating system. The color table provides the display attribute for the specified object based on the screen capability flag. Advantageously, the application program does not need to know the computer's display capability. Furthermore, the application program needs only one piece of computer code, regardless of the number of display capabilities which are possible. Thus, memory space in the palmtop is conserved. In another embodiment of the present invention, the application program is allowed to modify the default values of the display attributes in the color table. Thus, an application program could use its own color to display an object if the default color is undesirable.

Examples of objects are a menu frame or a user selection button displayed on the screen. For example, the button could be orange if the display mode is color, black if the display mode is monochrome, or a specific shade of gray if the display mode is gray-scale. The application program does not need to know the display mode. It simply requests that the operating system provide the appropriate display attribute from the color table based on a request to display the object.

More specifically, an embodiment of the present invention includes a method of displaying information, the method having the steps of: a) accessing a flag indicating a display mode of a display screen of a computer system; b) an application program of the computer system making a call to request a display attribute for an object to be displayed on the display screen; c) in response to the request, indexing a table with the display mode and an identifier of the object to obtain a display attribute, wherein the table is located externally of the application program and comprises a list of the objects and a plurality of display mode attribute lists, each of the display mode attribute lists having a display attribute associated with each of the objects; and, d) the application program displaying the object on the display screen with the display attribute, wherein the display capability of the display screen is transparent to the application program.

Another embodiment of the present invention allows for easy debugging of application programs. In this embodiment, the present invention assigns a substantially different color to each object in the color table. Thus, if the button border is orange, the button interior may be purple. Consequently, if the application programmer accidentally did not call the operating system to get the correct color for the object the program is currently rendering, there is a very good chance that the error will stand out.

In still another embodiment of the present invention, the application program is allowed to modify the default values in the color table. Thus, for example, an application program could use its own color to display a menu frame if the default color is undesirable. Furthermore, this modified value can be made to stay in effect for a later application program.

Still another embodiment of the present invention signals the application programmer that an undefined color was chosen. The present invention accomplishes this by returning a randomly determined color whenever the application program attempts to render with an undefined color.

Yet another embodiment of the present invention allows the user to choose the colors that objects are rendered with. The user can make these modifications applicable to all programs, or to individual programs.

BRIEF DESCRIPTION OF THE DRAWINGS

FIG. 3 is an exploded view of the components of the palmtop computer system of FIG. 2A.

FIG. 7 is a logical block diagram showing the relationship between the application software and the palmtop operating system, which includes the color table.

FIG. 8A is a color table used by the operating system to decide what color (or gray-scale) should be rendered on the palmtop display.

FIG. 8B illustrates an example list of object identifiers, which may be included in the color table.

FIG. 9 is a table used by the operating system to decide the color for an object to be displayed while in debug mode.

FIG. 10 illustrates a flowchart of the steps of an embodiment of the present invention for determining the color for an object to be displayed.

FIG. 11 illustrates a flowchart of the steps of an embodiment of the present invention useful for debugging application display programs.

DETAILED DESCRIPTION OF THE INVENTION

In the following detailed description of the present invention, a method and system for providing a color table to be used with a universal display program to select display attributes on different displays, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
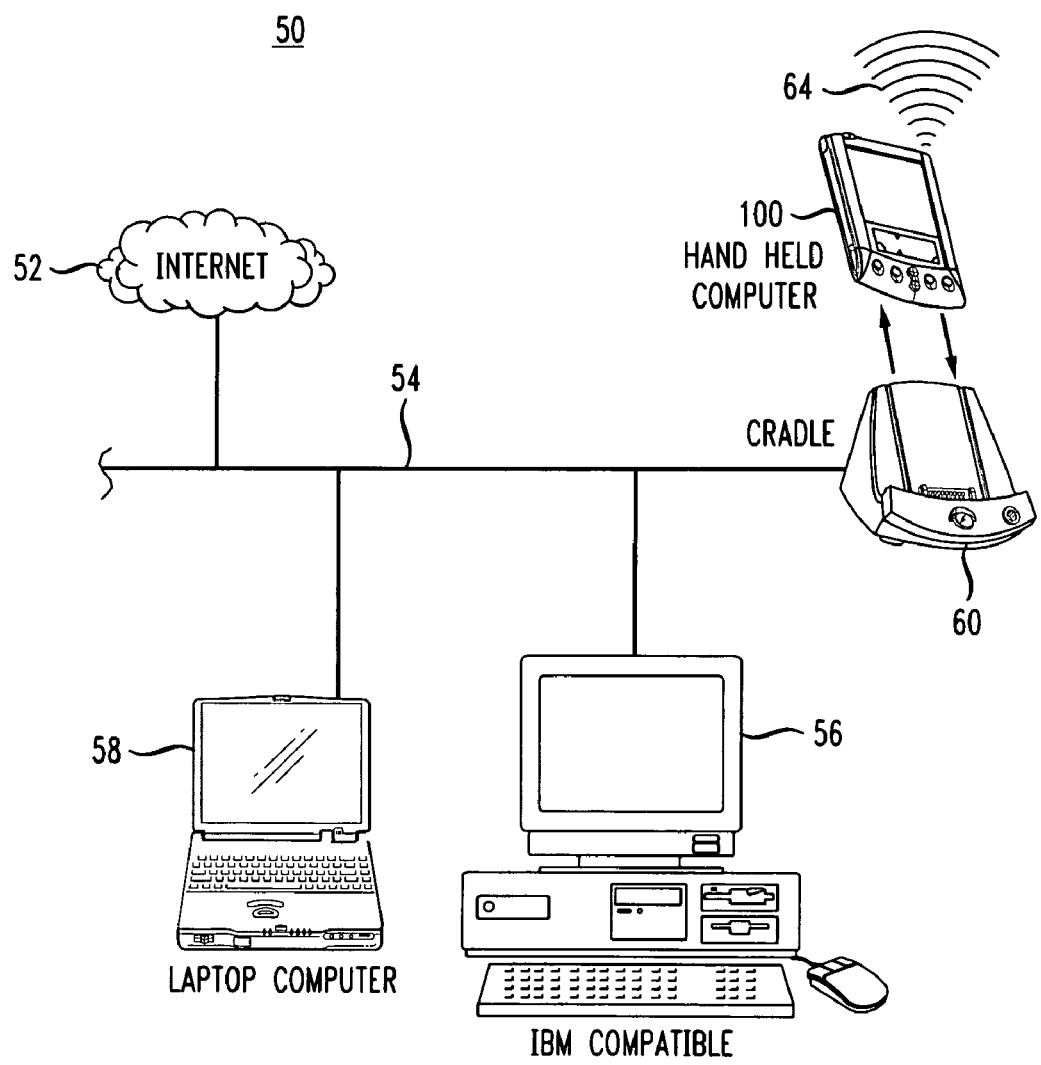
FIG. 1 is system illustration of a palmtop computer system connected to other computer systems and the Internet via a cradle device.

Method and Apparatus for Using a Color Table Scheme for Displaying Information on Either Color or Monochrome Display in Accordance with the Present Invention FIG. 1 illustrates a system 50 that can be used in conjunction with the color table scheme for displaying information system of the present invention. System 50 comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet, Local Area Network (LAN), etc. Optionally, bus 54 can provide communication with the Internet 52 using a number of well known protocols.

Importantly, bus 54 is also coupled to a cradle 60 for receiving and initiating communication with a palm top ("palm-sized") portable computer system 100 of the present invention. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

Figure 2A:
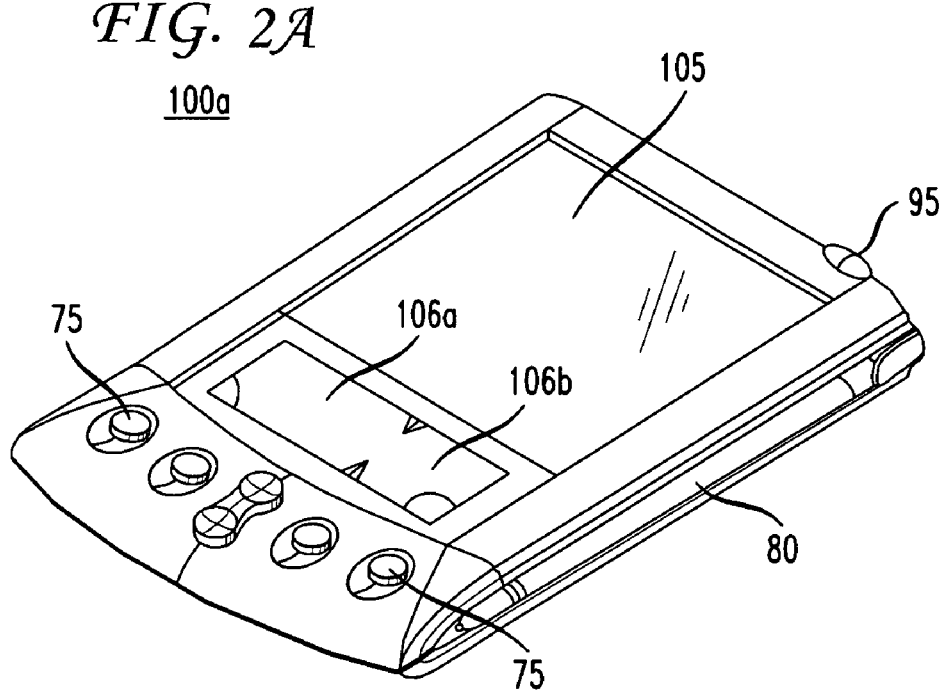
FIG. 2A is a top side perspective view of a palmtop computer system that can be used as a platform for the data entry embodiments of the present invention.

FIG. 2A is a perspective illustration of the top face 100a of one embodiment of the palmtop computer system of the present invention. The top face 110a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

Importantly, FIG. 2A also illustrates a handwriting recognition pad or "digitizer" containing two regions 106a and 106b. Region 106a is for the drawing of alpha characters therein for automatic recognition and region 106b is for the drawing of numeric characters therein for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 2B:
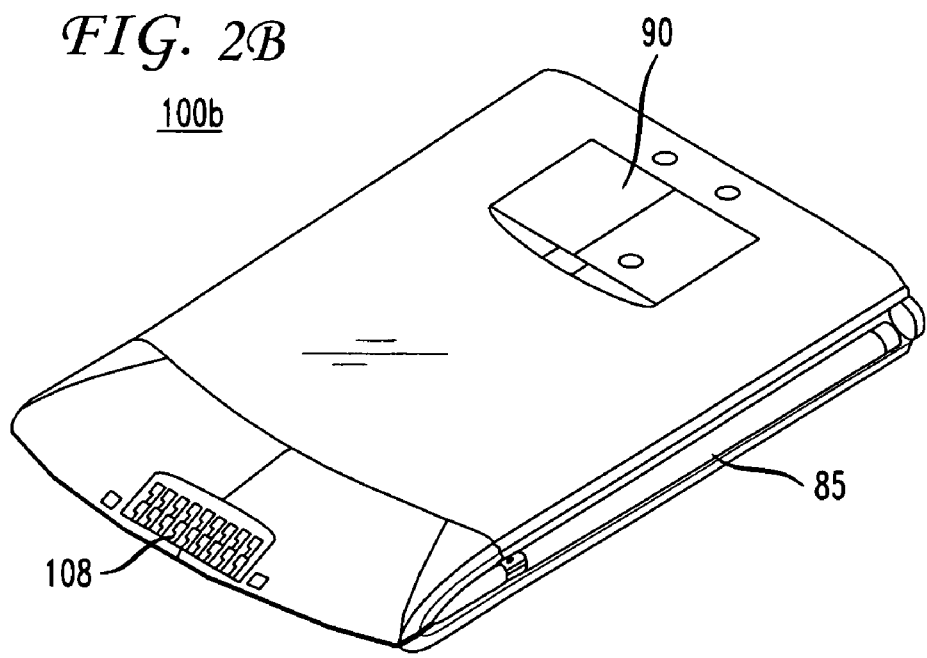
FIG. 2B is a bottom side perspective view of the palmtop computer system of FIG. 2A.

FIG. 2B illustrates the bottom side 100b of one embodiment of the palmtop computer system of the present invention. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc.

FIG. 3 is an exploded view of the palmtop computer system 100 in accordance with, one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation the Mobitex wireless communication system is used to provide two way communication between system 100 and other networked computers and/or the Internet via a proxy server.

Figure 4:
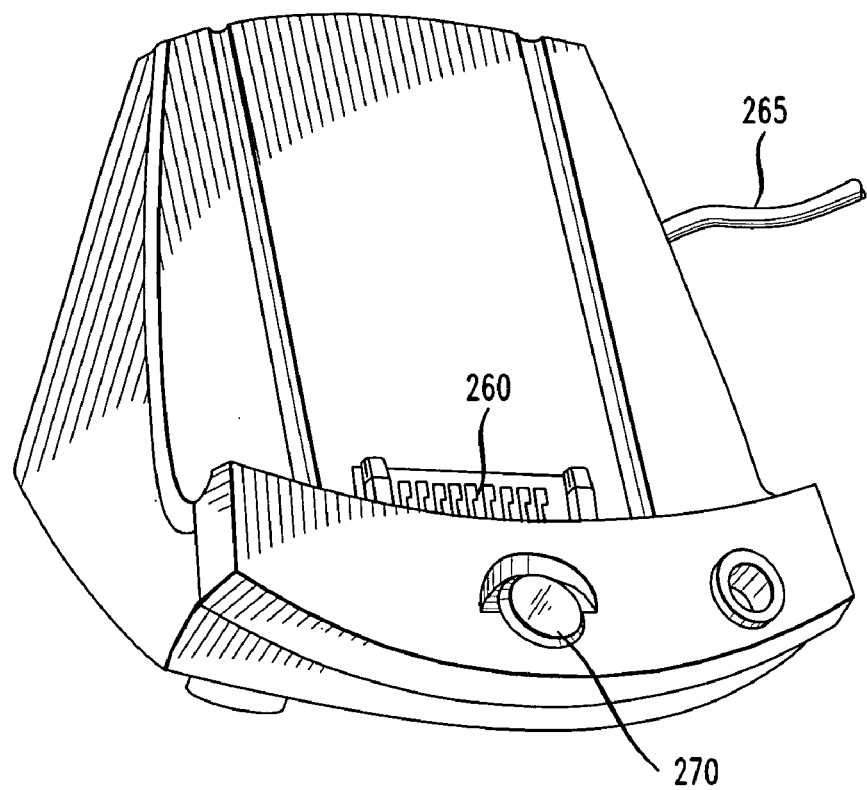
FIG. 4 is a perspective view of the cradle device for connecting the palmtop computer system to other systems via a communication interface.

FIG. 4 is a perspective illustration of one embodiment of the cradle 60 for receiving the palmtop computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

Figure 5:
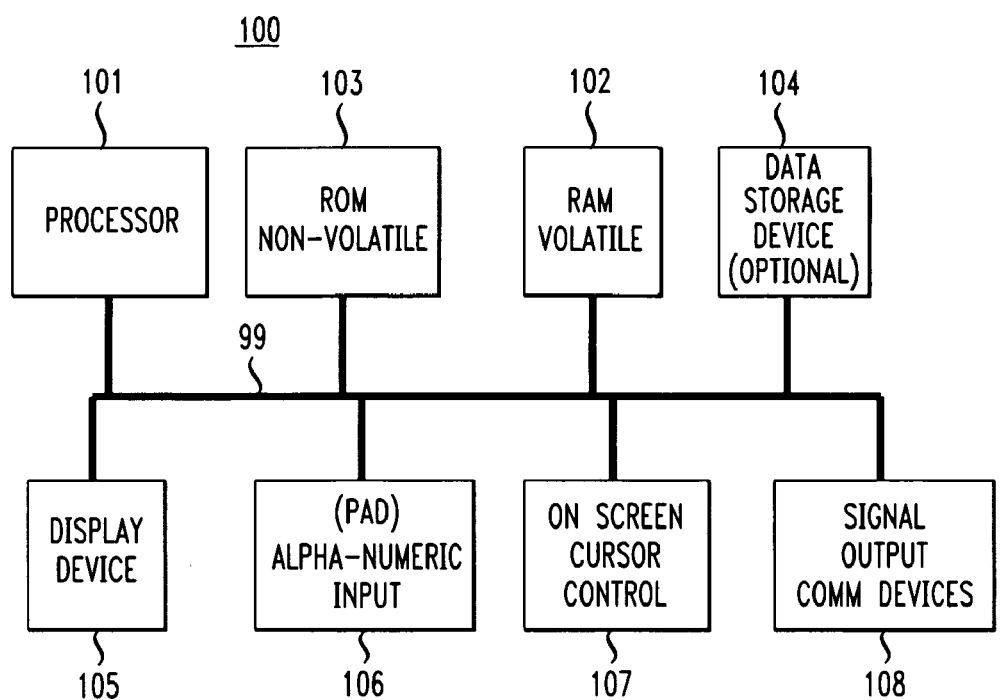
FIG. 5 is a logical block diagram of the palmtop computer system in accordance with an embodiment of the present invention.

FIG. 5 illustrates circuitry of computer system 100, some of which can be implemented on PC board 225. The computer system 100 can be used to perform color table scheme information display. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 110 also includes an optional data storage device 104 (e.g., memory stick) coupled with the bus 99 for storing information and instructions. Device 104 can be removable. As described above, system 100 also contains a display device 105 coupled to the bus 99 for displaying information to the computer user. PC board 225 can contain the processor 101, the bus 99, the ROM 103 and the RAM 102.

Also included in computer system 110 of FIG. 5 is an optional alphanumeric input device 106 which in one implementation is a handwriting recognition pad ("digitizer") having regions 106a and 106b (FIG. 2A), for instance. Device 106 can communicate information and command selections to the central processor 101. System 110 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact. The display device 105 utilized with the computer system 110 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device 108, also coupled to bus 99, can be a serial port for communicating with the cradle 60. Device 108 can also include an infrared communication port.

Figure 6:
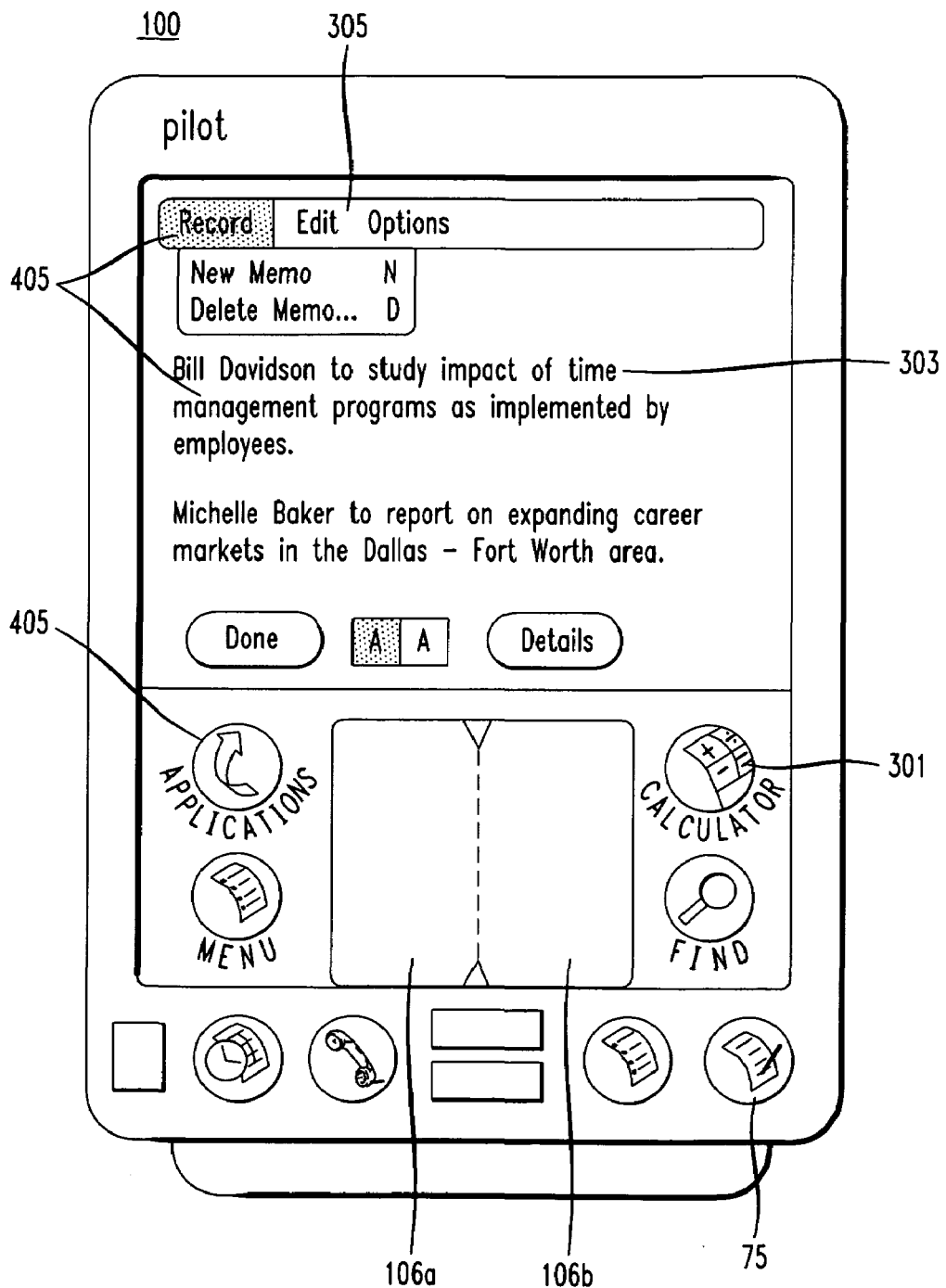
FIG. 6 is a front view of a palm top computer system illustrating the display screen, digitizer regions and an exemplary menu in accordance with the present invention.

FIG. 6 is a front view of the palmtop computer system 100 with a menu bar 305 open displaying a pull down window. Also shown are two regions of digitizer 106a and 106b. Region 106a is for receiving user stroke data for alphabetic characters, and typically not numeric characters, and region 106b is for receiving user stroke data for numeric data, and typically not for alphabetic characters. Physical buttons 75 are also shown. Although different regions are shown for alphabetic and numeric characters, the present invention is also operable within a single region that recognizes both alphabetic and numeric characters. FIG. 6 also shows objects 405, such as: on-screen buttons 301, text 303, and menu bar 305. The present invention provides for a system for displaying these objects 405 in desired colors or grayscales, depending upon the display capability of the computer 100.

FIG. 7 is a diagram showing the relationship between the application program 400 and the operating system 402 of the palmtop computer 100, which contains the color table 404. The application program 400 is universal, in that it does not need to have any information as to the display capability of display 105. FIG. 7 shows example subroutines 407: SET_COLOR and DRAW_LINE, which the application program 400 uses to assist in rendering objects 405 on the display 105. The subroutine SET_COLOR, having the object identifier 409 MENU_FRAME is used to obtain the correct display attribute for an object 405—in this case, the menu frame. The application program 400 makes a call to the operating system 402, which has a color table 404 and access to a display capability flag 401. The display capability flag reflects the type of display screen 105 that is installed in computer system 100. (Or the display mode of a display screen.) Based on the display capability flag 401, the operating system 402 returns to the application program 400 the appropriate display attribute 403 for the object 405 to be displayed. Thus, the application program 400 does not need to know the display capability. This greatly simplifies the application programmer's task, and different applications do not have to be written for each possible display capability. Additionally, the application program 400 only needs one piece of code for this operation. Thus, memory space in the palmtop is conserved.

FIG. 8A shows a color table 404 which is used by operating system 402 to determine the appropriate display attribute 403 for an object 405 to be rendered. The color table 404 comprises an object identifier list 406, including object identifiers 409, such as button border 408, menu frame 410, menu fill 412, and menu foreground 414. The table also has display mode attribute lists 450. The various display attribute lists 450 shown in table 404 are: 1-bit or monochrome display attribute list 420, 2-bit gray display attribute list 422, 4-bit gray display attribute list 424, and 8-bit color display attribute list 426. Each of these display attribute lists corresponds to one screen display capability. Thus, the attribute list for 4-bit gray includes 16 shades of gray and 8-bit color includes up to 256 unique colors. In order to obtain the correct display attribute 403, the operating system 402 indexes the color table 404 with the display capability flag 401 and the object identifier 409 passed to it by the application program 400.

As the color table 404 shows, when using a monochrome display all objects are rendered in black or white. For all other screen display modes, a default display attribute 403 is assigned to each object 405. The color table 404 could be expanded to include more display attribute lists 450, as well as more object identifiers 409.

FIG. 8B is an exemplary object identifier list 406. Each object identifier 409 in FIG. 8B, such as UIMenuFrame or UIMenuFill is in the object identifier list 406 in the color table 404 in FIG. 8A.

FIG. 9 shows a color table 404 according to one embodiment of the present invention, which is useful for debugging application display programs. In this embodiment, one of the display attribute lists is a debug mode. When the application programmer desires to debug programs, the application program 400 sets the display capability flag 401 to debug mode. In this embodiment, the color table 404 has a debug attribute list 428. When in debug mode, all calls to the operating system 402 requesting display attributes 403 for objects 405 will reference the debug mode attribute list 428. The colors in the debug mode attribute list 428 are substantially different from each other. This aids in debugging application programs 400 as follows.

After the application program 400 calls the operating system 402 for the display attribute 403 to render an object 405, all objects 405 will be rendered with that attribute 403 until a new call is made to the operating system 402. Thus, if the application 400 fails to call the operating system 402 when necessary, or if it calls with the wrong object identifier 409, the object 405 could be rendered with the wrong display attribute 403. This could be difficult to detect if there is little difference between the two display attributes 403, for example, if they are two similar shades of red. However, because all of the colors in the debug mode attribute list 428 are substantially different from each other, the mistake should be obvious.

FIG. 10 is a flowchart showing the process of rendering an object on the display in the appropriate color given the display capability in accordance with the present invention. In step 1002, a flag 401 is stored that indicates the display capability of the display 105. In step 1004, the application program requests a display attribute 403 for a specific object 405. In step 1006, the operating system 402 indexes a color table 404 with the display capability flag 401 and an identifier 409 corresponding to the object 405. The table 404 contains the appropriate display attribute 403 for the given object 405 and display capability. Thus, the operating system 402 is then able, in step 1008, to return the display attribute 403 to the application program 400. In step 101Q, the application program 400 displays the object 405 with the correct display attribute 403 on the display screen 105. In step 1012, the returned display attribute 403 remains as the display attribute 403 for all other objects 405 until another call is made to the operating system 402 to access the color table 404.

FIG. 11 is a flowchart showing the steps of the process for the debug mode embodiment of the present invention. In step 1102, the application program 400 sets the display capability flag 401 to debug mode. In step 1104, the application program 400 requests a display attribute 403 for a specific object 405. In step 1106, the operating system 402 indexes a table 404 with the display capability flag 401 and an identifier 409 of the object 405. The table 404 contains the appropriate display attribute 403 for the given object 409 when in debug mode. Thus, the operating system 402 is there able, in step 1108, to return the display attribute 403 to the application program 400. In step 1110, the application program 400 instructs that the object 405 be displayed with the correct display attribute 403 on the display screen 105. If the application program 400 called the operating system 402 with the wrong object identifier 409, the error should stand out as the object 405 will be displayed in a different color than normal. In step 1112, the returned display attribute 403 remains as the attribute 403 for all other objects 405 until another call is made to the color table 404. Therefore, if the application program 400 fails to call the operating system 402 when displaying a different object 405 from the last call, the lack of different color for the two different kinds of objects 405 should alert the programmer of the mistake.

Another embodiment of the present invention allows the application program 400 to modify the colors that objects 405 are rendered with. This is very desirable for some applications. For example, astronomers need to limit the amount of light in their environment to facilitate stellar viewing. An application program 400 might render all objects 405 in red, thus limiting undesirable light in the environment. The application program 400 accomplishes this by changing all the values in the 8-bit color display attribute list 426 to, for instance, red.

Furthermore, one embodiment of the present invention allows the modified values selected by one application program 400 to affect later application programs 400. Thus, in the above example, a first program might be an astronomy mode program which would 1) set all the display attributes 403 in the color table 404 to red, and 2) instruct that the display attributes 403 stay in effect for later programs. Thus, if an astronomer puts the computer 100 into astronomy mode, then whatever programs run afterwards, such as a calendar program, an address book, or an Internet program would have all objects 405 displayed in red, and stellar viewing would not be compromised.

Another embodiment of the present invention allows the user to change the display attributes 403. This can be accomplished by displaying the object 405 along with a color palette menu on the display screen 105 and having the user touch the desired color with stylus 80. Alternatively, the color table 404 could be shown on the display screen 105 and the user allowed to modify it. However, those of ordinary skill in the art will recognize that there are numerous other ways for the user to choose a new display attribute 403 for objects 405. In another embodiment, the user need only set the new display attribute 403 once, and all application programs 400 will render objects 405 in this new user defined display attribute 403.

Figure 12:
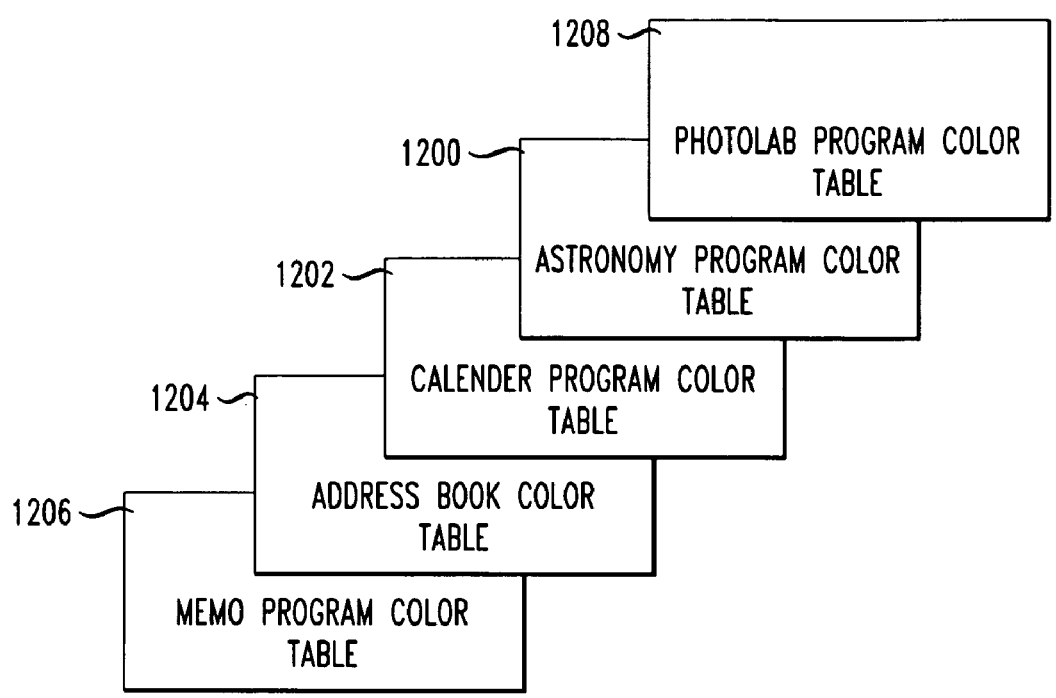
FIG. 12 illustrates a depiction of multiple color tables in accordance with one embodiment of the present invention, which allows the user to have multiple color tables.

However, the user defined display attributes do not have to affect all programs 400. For example, the user could set the display attributes one way for a astronomy program, another way for a calendar program, and still another way for a photolab program. Thus, the present invention allows the user to effectively have multiple color tables 404. FIG. 12 is a diagram reflecting the multiple color tables 404 that the user may have. For example, the user could have an astronomy program color table 1200, a calendar program color table 1202, an address book color table 1204, a memo program color table 1206, and a photolab program color table 1208.

In yet another embodiment of the present invention, the application programmer is signaled that the program 400 is rendering an object 405 in an undefined color. Some of the 256 possible colors for an 8-bit color display capability may be undefined. It is possible, however, for the application programmer to use the values for these colors when rendering objects 405. In the future, when colors are assigned for these undefined colors, the application program 400 could experience unexpected results. For example, an object 405 which was always rendered black may be rendered a vibrant color in a later version of the computer system 100. The present invention cues the application programmer that an undefined color is being used by assigning a randomly generated color to undefined values each time the operating system 402 starts up. Thus, if the application program 400 were to use an undefined color, it will be rendered in a random color each time the palmtop is turned on and the application programmer should see something is wrong.

The preferred embodiment of the present invention, a method and system providing information display for a computer, is thus described. While the present invention has been described in particular embodiments, it should be appreciated that the present invention should not be construed as limited by such embodiments, but rather construed according to the below claims.

What is claimed is:

1. In a computer system, a method of displaying information, comprising:
   a) accessing a flag indicating a display mode of a display screen of a computer system, wherein said display mode indicates a display capability of said display screen;
   b) an application program of said computer system making a call to request a display attribute for an object to be displayed on said display screen;
   c) in response to said request, indexing a table with said flag and an object identifier to obtain a display attribute, wherein said object identifier identifies said object, and wherein said table is located in said computer system externally of said application program and comprises a list of said object identifiers and a plurality of display attribute lists, each of said display attribute lists having a display attribute associated with each of said object identifiers, wherein at least two of said display attribute lists correspond to different potential display capabilities of said display screen; and,
   d) said application program displaying said object on said display screen with said display attribute, wherein said display capability of said display screen is transparent to said application program.

2. The method of claim 1, wherein said plurality of display attribute lists comprise a first and a second, and wherein:
   said first display attribute list has all of its associated display attributes being color; and,
   said second display attribute list has all of its associated display attributes being monochrome.

3. The method of claim 2, wherein said plurality of display attribute lists comprise a third, and wherein said third display attribute list has all of its associated display attributes being a gray-scale value.

4. The method of claim 1, wherein one of said display attribute lists has all of its associated display attributes as being colors which are substantially different from each other, such that debugging said application program is facilitated.

5. The method of claim 1, further comprising said application program changing at least one of the display attributes in at least one of said display attribute lists.

6. The method of claim 5, further comprising said application program causing said changes to the display attributes to remain in effect when the next application program runs.

7. The method of claim 5, further comprising:
each time the computer system starts up, assigning a random color to each undefined color, such that if the application program changes one of said display attributes to one of said undefined colors, then the display attribute of said object displayed on said display screen is likely to be different each time the computer system starts up.

8. The method of claim 1, further comprising a user of said computer system changing said display mode.

9. The method of claim 1, wherein said table resides in an operating system of said computer system.

10. A computer system comprising:
a processor coupled to a bus;
a display screen coupled to said bus;
a memory unit coupled to said bus and comprising instructions that when executed by said processor implement a method of displaying information, comprising:
a) accessing a flag indicating a display mode of a display screen of a computer system, wherein said display mode indicates a display capability of said display screen;
b) an application program of said computer system making a call to request a display attribute for an object to be displayed on said display screen;
c) in response to said request, indexing a table with said flag and an object identifier to obtain a display attribute, wherein said object identifier identifies said object, and wherein said table is located in said computer system externally of said application program and comprises a list of said object identifiers and a plurality of display attribute lists, each of said display attribute lists having a display attribute associated with each of said object identifiers, wherein at least two of said display attribute lists correspond to different potential display capabilities of said display screen; and,
d) said application program displaying said object on said display screen with said display attribute, wherein said display capability of said display screen is transparent to said application program.

11. A computer system as described in claim 10, wherein said computer system is a portable computer system.

12. A computer system as described in claim 10, wherein said computer system is a palm-sized computer system.

13. In a palmtop computer system, a method of displaying information, comprising:
a) accessing a flag indicating a display mode of a display screen of a computer system, wherein said display mode indicates a display capability of said display screen;
b) an application program of said computer system making a call to request a display attribute for an object to be displayed on said display screen;
c) in response to said request, indexing a table with said flag and an object identifier to obtain a display attribute, wherein said object identifier identifies said object, and wherein said table is located in said computer system externally of said application program and comprises a list of said object identifiers and a plurality of display attribute lists, each of said display attribute lists having a display attribute associated with each of said object identifiers, wherein at least two of said display attribute lists correspond to different potential display capabilities of said display screen; and,
d) said application program displaying said object on said display screen with said display attribute, wherein said display capability of said display screen is transparent to said application program.

14. The method of claim 13, wherein said plurality of display attribute lists comprise a first and a second, and wherein:
said first display attribute list has all of its associated display attributes being color; and,
said second display attribute list has all of its associated display attributes being monochrome.

15. The method of claim 14, wherein said plurality of display attribute lists comprise a third, and wherein said third display attribute list has all of its associated display attributes being a gray-scale value.

16. The method of claim 13, wherein one of said display attribute lists has all of its associated display attributes as being colors which are substantially different from each other, such that debugging said application program is facilitated.

17. The method of claim 13, further comprising said application program changing at least one of the display attributes in at least one of said display attribute lists.

18. The method of claim 17, further comprising:
said application program causing said changes to the display attributes to remain in effect when the next application program runs.

19. The method of claim 17, further comprising:
each time the computer system starts up, assigning a random color to each undefined color, such that if the application program changes one of said display attributes to one of said undefined colors, then the display attribute of said object displayed on said display screen is likely to be different each time the computer system starts up.

20. The method of claim 13, further comprising a user of said computer system changing at least one of said display attributes.

21. The method of claim 17, wherein said application program changes the at least one of the display attributes in the at least one of said display attribute lists without user interaction.

* * * * *